US009443487B2

(12) United States Patent
Liu

(10) Patent No.: US 9,443,487 B2
(45) Date of Patent: Sep. 13, 2016

(54) DISPLAY DRIVING APPARATUS AND DRIVING METHOD THEREOF

(71) Applicant: Novatek Microelectronics Corp., Hsinchu (TW)

(72) Inventor: Wo-Chung Liu, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 107 days.

(21) Appl. No.: 13/745,869

(22) Filed: Jan. 21, 2013

(65) Prior Publication Data

US 2013/0201175 A1 Aug. 8, 2013

(30) Foreign Application Priority Data

Feb. 7, 2012 (TW) ............................ 101103885 A

(51) Int. Cl.

| | |
|---|---|
| ***G09G 5/00*** | (2006.01) |
| ***G06F 3/038*** | (2013.01) |
| ***G09G 3/36*** | (2006.01) |
| *G09G 3/00* | (2006.01) |

(52) U.S. Cl.

CPC .............. *G09G 5/00* (2013.01); *G09G 3/3614* (2013.01); *G09G 3/003* (2013.01); *G09G 2320/0247* (2013.01)

(58) Field of Classification Search

CPC ..................... G09G 2320/0247; G09G 3/003; G09G 3/3614; G09G 5/00

USPC .................................................... 345/209, 96

See application file for complete search history.

(56) References Cited

U.S. PATENT DOCUMENTS

| | | | |
|---|---|---|---|
| 7,592,992 | B2 | 9/2009 | Yi |
| 7,969,544 | B2 | 6/2011 | Uehara et al. |
| 8,040,307 | B2 | 10/2011 | Kim et al. |
| 8,446,554 | B2 | 5/2013 | Uehara et al. |
| 8,587,757 | B2 | 11/2013 | Uehara et al. |
| 8,687,160 | B2 | 4/2014 | Uehara et al. |
| 8,964,157 | B2 | 2/2015 | Uehara et al. |
| 9,104,079 | B2 | 8/2015 | Uehara et al. |

(Continued)

FOREIGN PATENT DOCUMENTS

| | | |
|---|---|---|
| CN | 101317212 | 12/2008 |
| CN | 101424850 | 5/2009 |
| CN | 101788718 | 7/2010 |
| CN | 102073182 | 5/2011 |
| CN | 102116983 | 7/2011 |
| TW | 591596 | 6/2004 |

(Continued)

OTHER PUBLICATIONS

"Office Action of Taiwan Counterpart Application", issued on Jun. 24, 2014, p. 1-8.

(Continued)

*Primary Examiner* — Long D Pham
(74) *Attorney, Agent, or Firm* — Jianq Chyun IP Office

(57) ABSTRACT

A display driving apparatus and driving method thereof are disclosed. The display driving apparatus includes a display panel and a display driver. The display panel has a plurality of pixels, and the pixels are arranged in an array. The pixels are divided into a plurality of first display regions and a plurality of second display regions, and each of the first display regions and each of the second display regions are arranged in the display panel alternately. The display driver provides a plurality of driving signals for driving the first and second display regions. The driving polarities of the neighboring first display regions are different, and the driving polarities of the neighboring second display regions are different.

8 Claims, 10 Drawing Sheets

(56) References Cited

U.S. PATENT DOCUMENTS

| | | | | |
|---|---|---|---|---|
| 2004/0239605 | A1 | 12/2004 | Wang et al. | |
| 2006/0164361 | A1 | 7/2006 | Yi | |
| 2008/0278466 | A1* | 11/2008 | Joo | G09G 3/3614 345/205 |
| 2009/0096943 | A1* | 4/2009 | Uehara et al. | 349/37 |
| 2011/0012887 | A1* | 1/2011 | Lee et al. | 345/212 |
| 2011/0156992 | A1* | 6/2011 | Moon et al. | 345/84 |
| 2011/0187705 | A1 | 8/2011 | Lan et al. | |
| 2011/0234556 | A1 | 9/2011 | Uehara et al. | |
| 2013/0229394 | A1 | 9/2013 | Uehara et al. | |
| 2014/0036185 | A1 | 2/2014 | Uehara et al. | |
| 2014/0184977 | A1 | 7/2014 | Uehara et al. | |
| 2015/0129884 | A1 | 5/2015 | Uehara et al. | |
| 2015/0325185 | A1 | 11/2015 | Uehara et al. | |

FOREIGN PATENT DOCUMENTS

| | | |
|---|---|---|
| TW | 200426762 | 12/2004 |
| TW | 200837706 | 9/2008 |
| TW | 200839719 | 10/2008 |
| TW | I329296 | 8/2010 |
| TW | 201129078 | 8/2011 |

OTHER PUBLICATIONS

"Office Action of China Counterpart Application", issued on Feb. 17, 2015, p. 1-10.

"Office Action of Taiwan Counterpart Application", issued on Jan. 13, 2016, p. 1-7.

"Office Action of Chinese Counterpart Application", issued on Nov. 23, 2015, p. 1-7.

* cited by examiner

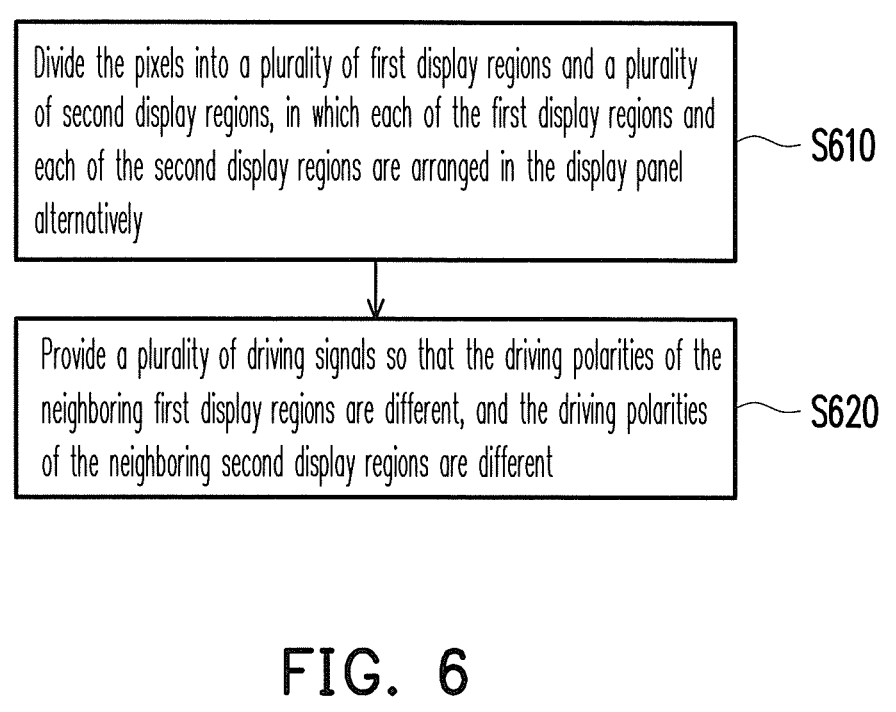

Divide the pixels into a plurality of first display regions and a plurality of second display regions, in which each of the first display regions and each of the second display regions are arranged in the display panel alternatively — S610

↓

Provide a plurality of driving signals so that the driving polarities of the neighboring first display regions are different, and the driving polarities of the neighboring second display regions are different — S620

FIG. 6

DISPLAY DRIVING APPARATUS AND DRIVING METHOD THEREOF

CROSS-REFERENCE TO RELATED APPLICATION

This application claims the priority benefit of Taiwan application serial no. 101103885, filed on Feb. 7, 2012. The entirety of the above-mentioned patent application is hereby incorporated by reference herein and made a part of this specification.

BACKGROUND OF THE INVENTION

1. Technical Field

The invention relates to a display driving apparatus and a driving method thereof, and more particularly to a display driving apparatus and a driving method thereof providing a stereoscopic visual effect.

2. Related Art

With the advancement in electronic technology, providing high quality display effects on electronic products has become a necessary trend. Regarding current liquid crystal display (LCD) devices, besides increasing the resolution and the refresh rate of the display frame and lowering the power consumption, providing stereoscopic visual effects has also become an important function of the display apparatus.

Referring to FIG. 1, FIG. 1 is a schematic view of a conventional display panel 100 executing a dot inversion driving method. The display panel has a plurality of pixels arranged in an array. In the display panel 100, the driving polarities of each neighboring pixel are reversed to generate the so-called dot inversion effect. As one skilled in the art would appreciate, the dot inversion driving method not only can overcome the polarization issue in liquid crystals, but the flicker phenomenon of the display frames can be reduced. However, when this type of display panel 100 is used to generate the stereoscopic visual display effect, a display region 110 is provided as a left eye image (or right eye image), and a display region 120 is provided as a right eye image (or left eye image). Accordingly, the dot inverted effect of the images viewed by a single eye is cancelled, and the flicker phenomenon of the display images is increased relatively.

SUMMARY OF THE INVENTION

The invention provides a display driving apparatus and a driving method of a display panel thereof, capable of effectively enhancing the image display quality.

The invention provides a display driving apparatus including a display panel and a display driver. The display panel has a plurality of pixels arranged in an array, in which the pixels are divided into a plurality of first display regions and a plurality of second display regions. Each of the first display regions and each of the second display regions are arranged in the display panel alternately. The display driver is coupled to the display panel, and the display driver provides a plurality of driving signals so that the driving polarities of the neighboring first display regions are different, and the driving polarities of the neighboring second display regions are different.

According to an embodiment of the invention, each of the first display regions includes M first sub display regions and M second sub display regions. Each of the second display regions includes M third sub display regions and M fourth sub display regions. Each of the first and second sub display regions are arranged alternately, and each of the third and fourth sub display regions are arranged alternately. Moreover, each of the first, second, third, and fourth sub display regions respectively includes N display columns. The driving polarities of the neighboring first and second sub display regions are different, the driving polarities of the neighboring third and fourth sub display regions are different, and M and N are positive integers.

According to an embodiment of the invention, each of the first display regions includes M first sub display regions and M second sub display regions. Each of the second display regions includes M third sub display regions and M fourth sub display regions. Each of a plurality of the neighboring first sub display regions and each of a plurality of the neighboring second sub display regions are arranged alternately. Each of a plurality of the neighboring third sub display regions and each of a plurality of the neighboring fourth sub display regions are arranged alternately. Moreover, each of the first, second, third, and fourth sub display regions respectively includes N display columns. The driving polarities of the neighboring first and second sub display regions are different, the driving polarities of the neighboring third and fourth sub display regions are different, and M and N are positive integers.

According to an embodiment of the invention, each of the first and second display regions respectively includes a plurality of first and second display rows, in which the driving polarities of the neighboring first display rows are different, and the driving polarities of the neighboring second display rows are different.

According to an embodiment of the invention, each of the first display rows includes at least one first sub display row having a same driving polarity, and each of the second display rows includes at least one second sub display row having a same driving polarity.

According to an embodiment of the invention, each of the first display regions includes a plurality of first and second sub display regions. Moreover, the driving polarities of the first sub display regions are the same, and the driving polarities of the second sub display regions are the same.

According to an embodiment of the invention, each of the second display regions includes a plurality of third and fourth sub display regions. In addition, the driving polarities of the third sub display regions are the same, and the driving polarities of the fourth sub display regions are the same.

According to an embodiment of the invention, the first display regions display a first eye image, and the second display regions display a second eye image.

The invention provides a driving method of a display panel, the display panel having a plurality of pixels arranged in an array, and the driving method includes the following steps. The pixels are divided into a plurality of first display regions and a plurality of second display regions, in which each of the first display regions and each of the second display regions are arranged in the display panel alternately. Moreover, a plurality of driving signals are provided so that the driving polarities of the neighboring first display regions are different, and the driving polarities of the neighboring second display regions are different.

In summary, in the display driving apparatus and the driving method of the display panel thereof according to some embodiments of the invention, by setting the properties of the driving polarities between different display regions, the pixels belonging to the same display region can generate the polarity inversion display effect, thereby enhancing the display quality.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a flow chart of a driving method of a display panel according to an embodiment of the invention.

DESCRIPTION OF EMBODIMENTS

Figure 1:
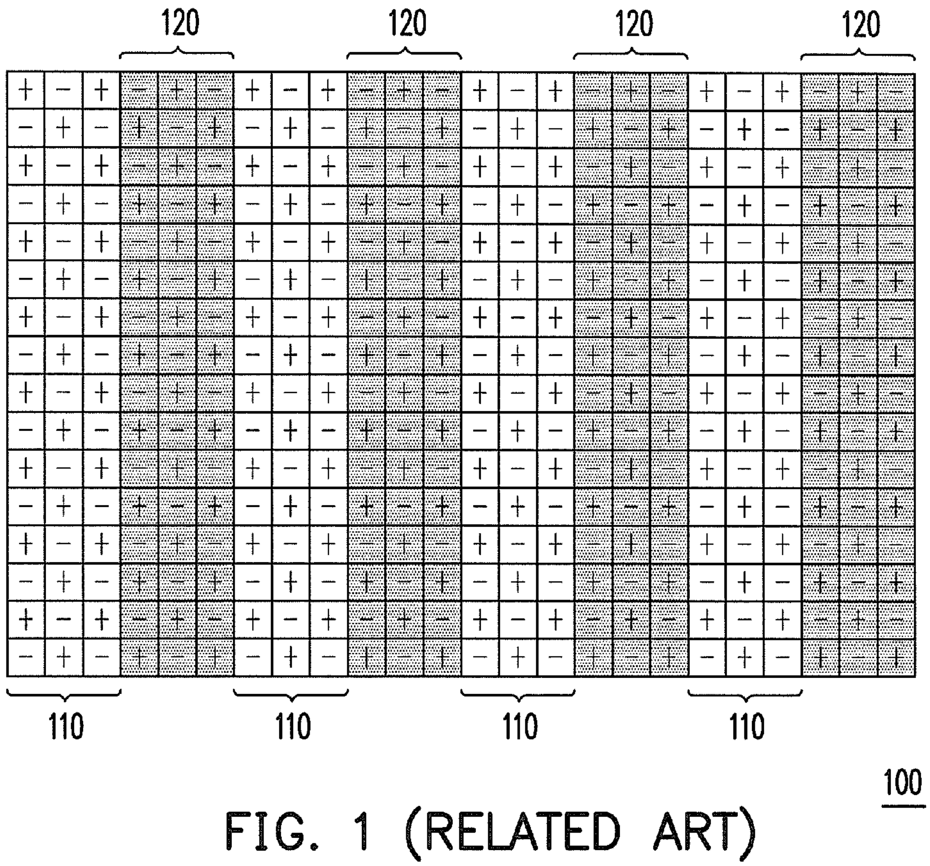
FIG. 1 (RELATED ART)
FIG. 1 is a schematic view of a conventional display panel executing a dot inversion driving method.
Figure 2:
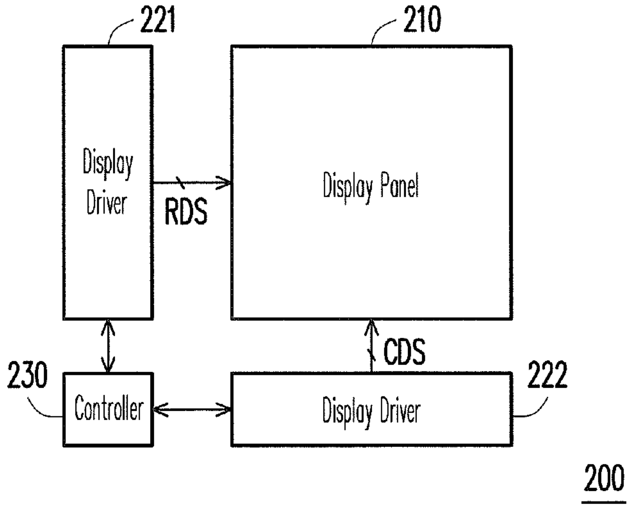
FIG. 2 is a schematic view of a display driving apparatus 200 according to an embodiment of the invention.

Referring to FIG. 2, a schematic view of a display driving apparatus 200 according to an embodiment of the invention is depicted. The display driving apparatus 200 includes a display panel 210, two display drivers 221 and 222, and a controller 230. The display panel 210 has a plurality of pixels arranged in an array. The display drivers 221 and 222 respectively provides the driving signals RDS and CDS. Moreover, the display panel 210 is driven by the driving signals RDS and CDS to display the display images. The controller 230 is coupled to the display drivers 221 and 222 and provides a controller signal, so that the display drivers 221 and 222 generate the driving signals RDS and CDS. In the present embodiment, the display driver 221 is a gate driver, and the display driver 222 is a source driver, for example.

Figure 3A:
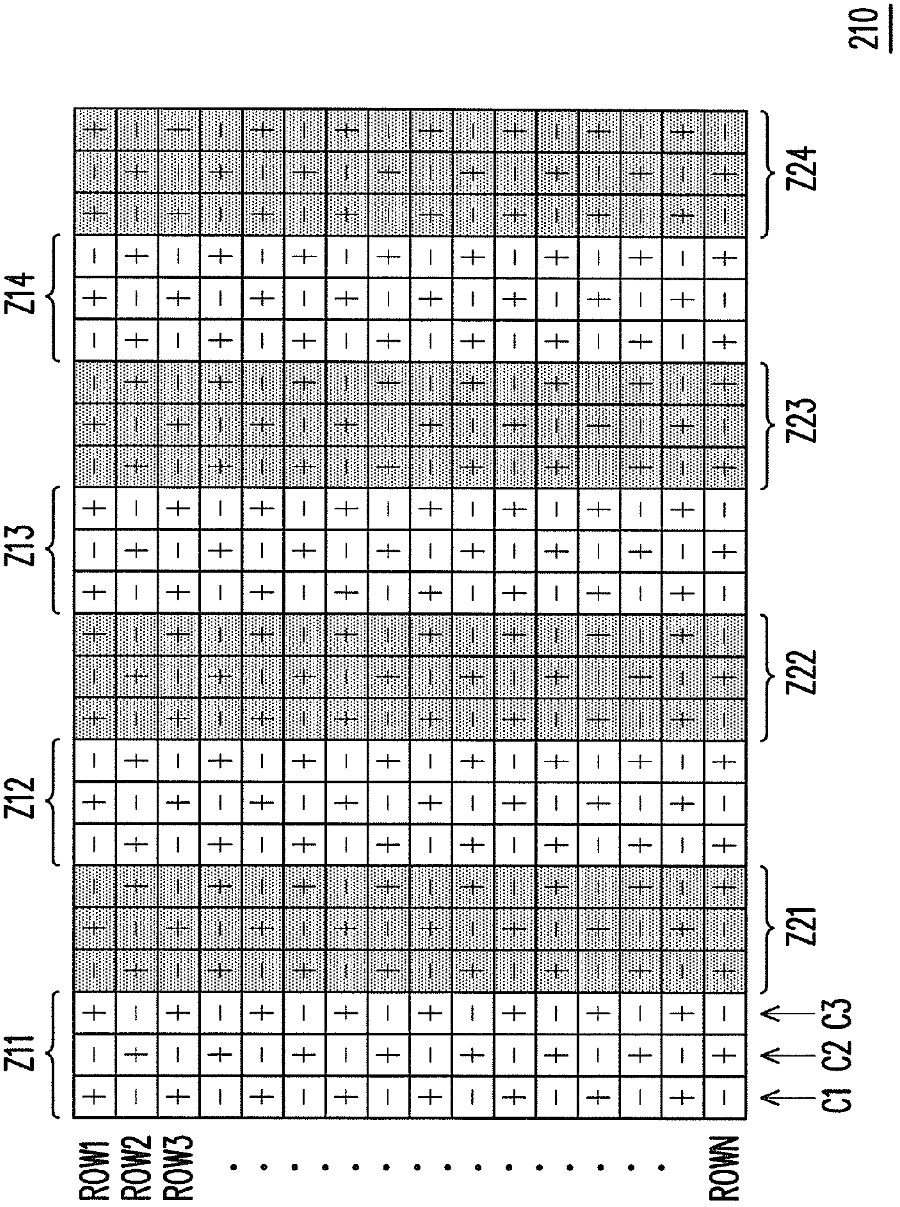
FIGS. 3A-3F illustrate embodiments of a display panel 210 having a plurality of different driving polarities.

Referring to FIGS. 2 and 3A, FIG. 3A illustrates an embodiment of a driving polarity of the display panel 210. In FIG. 3A, the pixels in the display panel 210 are divided into a plurality of first display regions Z11-Z14 and a plurality of second display regions Z21-Z24. Each of the first display regions Z11-Z14 and each of the second display regions Z21-Z24 are arranged in the display panel 210 alternately. In other words, as shown in FIG. 3A, the first display region Z11, the second display region Z21, the first display region Z12, the second display region Z22, the first display region Z13, the second display region Z23, the first display region Z14, and the second display region Z24 are sequentially arranged from left to right in FIG. 3A.

It should be noted that, when the display panel 210 is displaying frames, the display drivers 221 and 222 make the driving polarities of the neighboring first display regions different through the driving signals RDS and CDS. Moreover, the display drivers 221 and 222 make the driving polarities of the neighboring second display regions different through the driving signals RDS and CDS. To be specific, the driving polarities of the first display region Z11 is different (reversed) from the driving polarities of the neighboring first display region Z12, and the driving polarities of the first display region Z12 is different from the driving polarities of the neighboring first display regions Z11 and Z13. On the other hand, the driving polarities of the first display region Z13 is different from the driving polarities of the neighboring first display regions Z12 and Z14. Moreover, the driving polarities of the second display region Z21 is different (reversed) from the driving polarities of the neighboring second display region Z22, and the driving polarities of the second display region Z22 is different from the driving polarities of the neighboring second display regions Z21 and Z23. The driving polarities of the second display region Z23 is different from the driving polarities of the neighboring second display regions Z22 and Z24.

In addition, as shown in FIG. 3A, the first display regions Z11-Z14 and the second display regions Z21-Z24 of the display panel 210 each includes N display rows ROW1-ROWN, in which N is a positive integer. It should be noted that, whether in the first display regions Z11-Z14 or the second display regions Z21-Z24, the driving polarities of the neighboring display columns are different within the same display region. Taking the first display region Z11 as an example, the driving polarities of the display row ROW2 in the first display region Z11 are different from the display rows ROW1 and ROW3.

Moreover, each of the first display regions Z11-Z14 and each of the second display regions Z21-Z24 include a plurality of display columns (e.g., three display columns in the present embodiment), and in the same display region, the driving polarities of the neighboring display columns are different (reversed). Taking the first display region Z11 as an example, the first display region Z11 includes the display columns C1, C2, and C3. The driving polarities of the display column C1 and the display column C2 are different, and the driving polarities of the display column C2 and the display column C3 are different.

When the display panel 210 displays stereoscopic images, the first display regions Z11-Z14 may be provided as a first eye image (e.g. left eye image), and the second display regions Z21-Z24 may be provided as a second eye image (e.g. right eye image). Accordingly, the images seen by one eye still have the dot inversion effect, and thereby the image flicker phenomenon can be reduced.

Figure 3B:
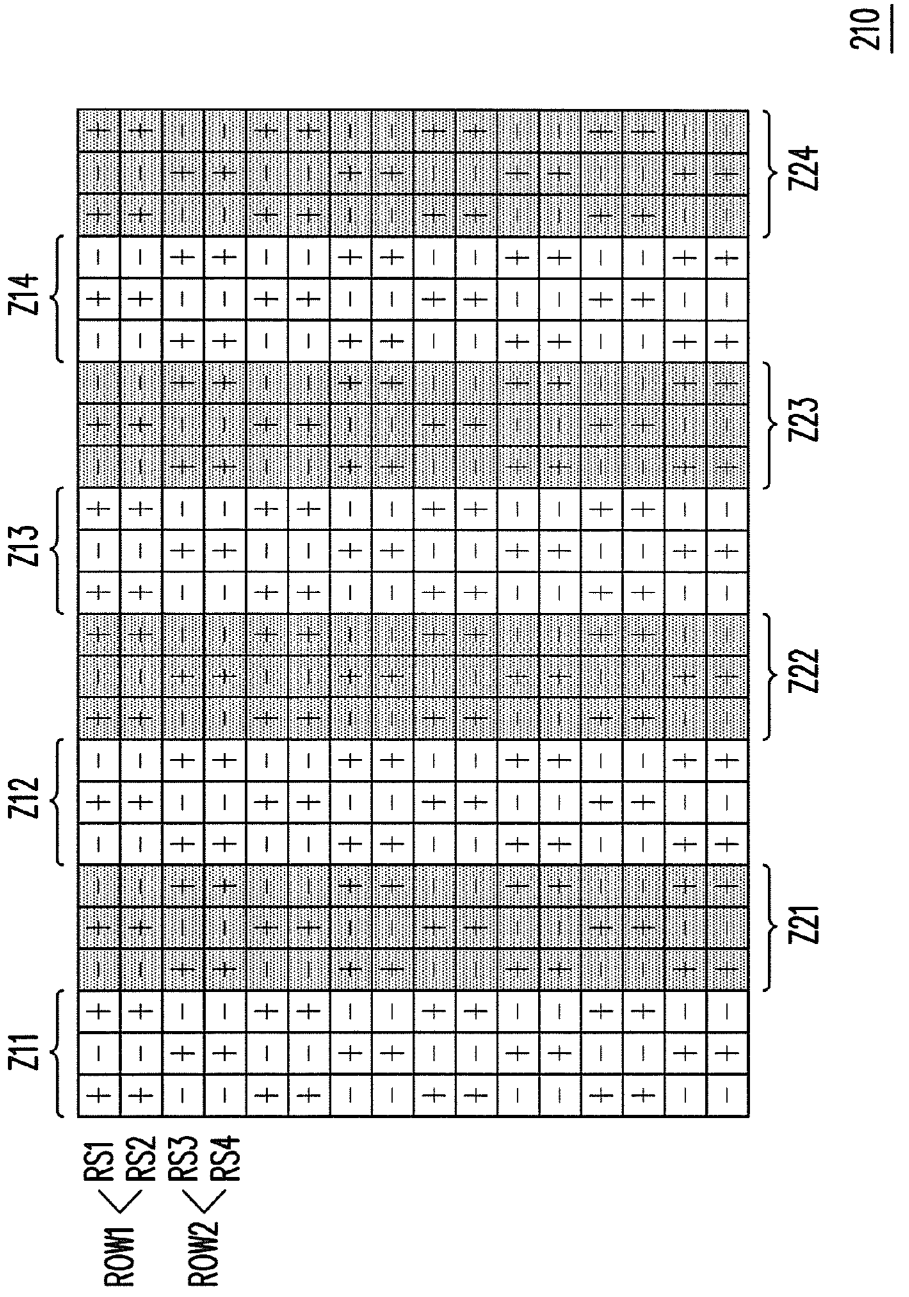

Please refer to FIG. 3B, FIG. 3B illustrates an embodiment of another driving polarity of the display panel 210. In FIG. 3B, each of the display rows ROW1-ROWN may be divided into two sub display rows. Taking the display rows ROW1 and ROW2 as an example, the display row ROW1 may be divided into the sub display rows RS1 and RS2, and the display row ROW2 may be divided into the sub display rows RS3 and RS4. It should be appreciated that, the driving polarities of the sub display rows in a same display row are the same. In other words, the driving polarities of the sub display rows RS1 and RS2 in the display row ROW1 are the same, and the driving polarities of the sub display rows RS3 and RS4 in the display row ROW2 are the same. In addition, the driving polarities of the sub display rows RS3 and RS4 are different from the driving polarities of the sub display rows RS1 and RS2.

Figure 3C:
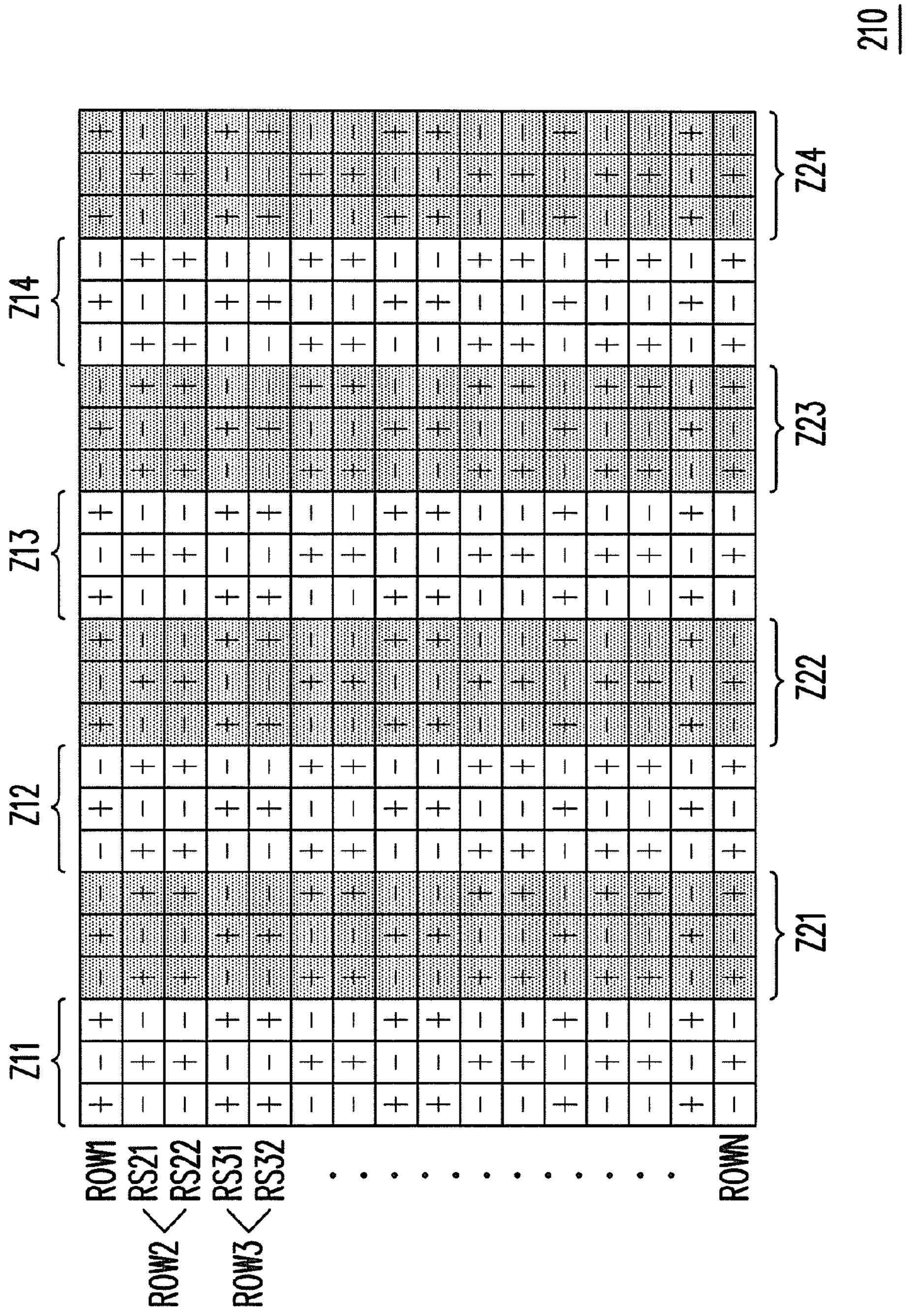

Please refer to FIG. 3C, FIG. 3C illustrates an embodiment of another driving polarity of the display panel 210. In FIG. 3C, all of the display rows other than the first display row ROW1 and the last display row ROWN are divided into two sub display rows, and the driving polarities of the sub display rows in a same display row are the same. Taking the display rows ROW2 and ROW3 as an example, the display rows ROW2 and ROW3 are divided into two sub display rows RS21 and RS22 and two sub display rows RS31 and RS32. Moreover, the driving polarities of the sub display rows RS21 and RS22 are the same, and the driving polarities of the sub display rows RS31 and RS32 are the same.

Figure 3D:
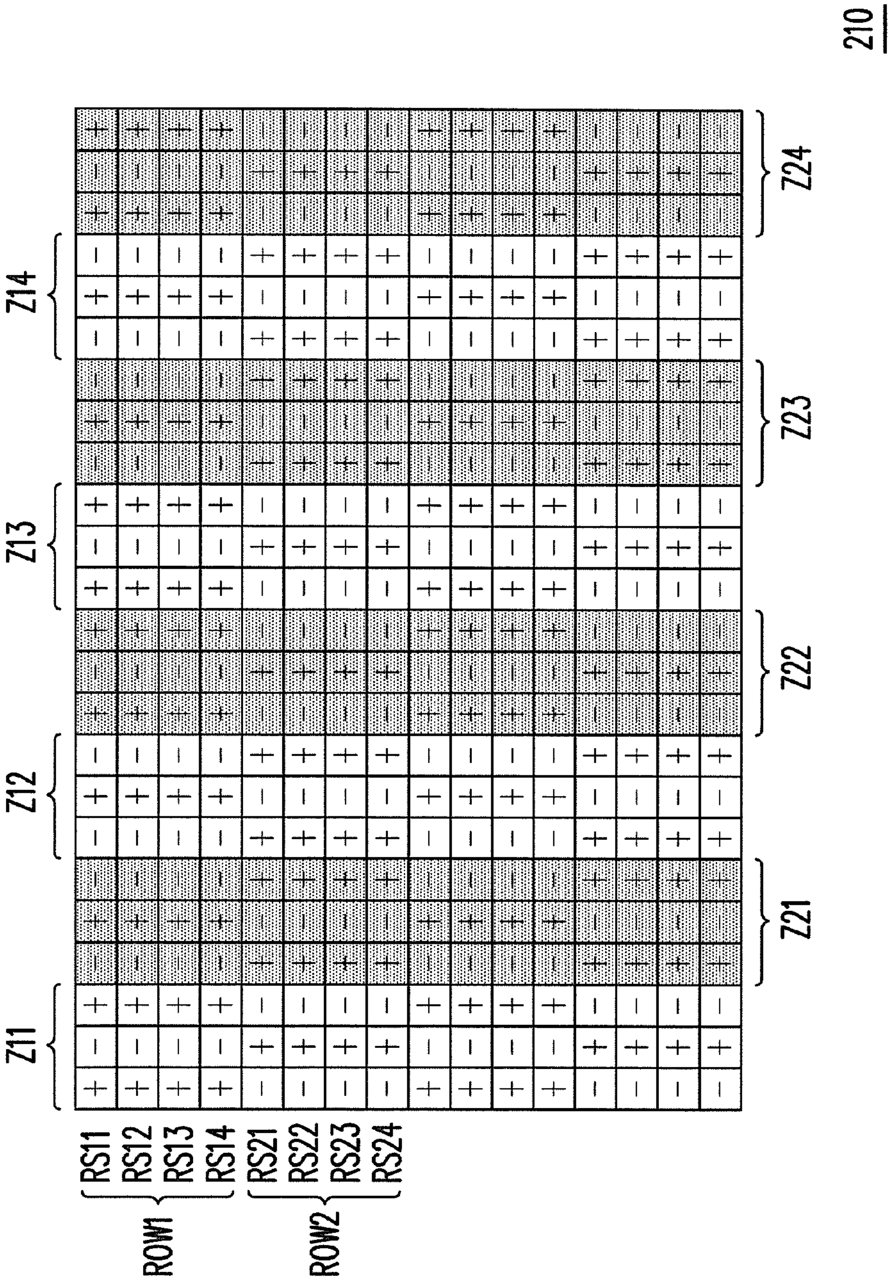

Please refer to FIG. 3D, FIG. 3D illustrates an embodiment of another driving polarity of the display panel 210. The display rows may not only be divided into two sub display rows. In FIG. 3D, each of the display rows is divided into four sub display rows, and the driving polarities of the four sub display rows in a same display row are the same. Taking the display rows ROW1 and ROW2 as an example, the display row ROW1 is divided into four sub display rows RS11-RS14, and the display row ROW2 is divided into four sub display rows RS21-RS24. Moreover, the driving polarities of the sub display rows RS11-RS14 are the same, and the driving polarities of the sub display rows RS21-RS24 are the same.

Figure 3E:
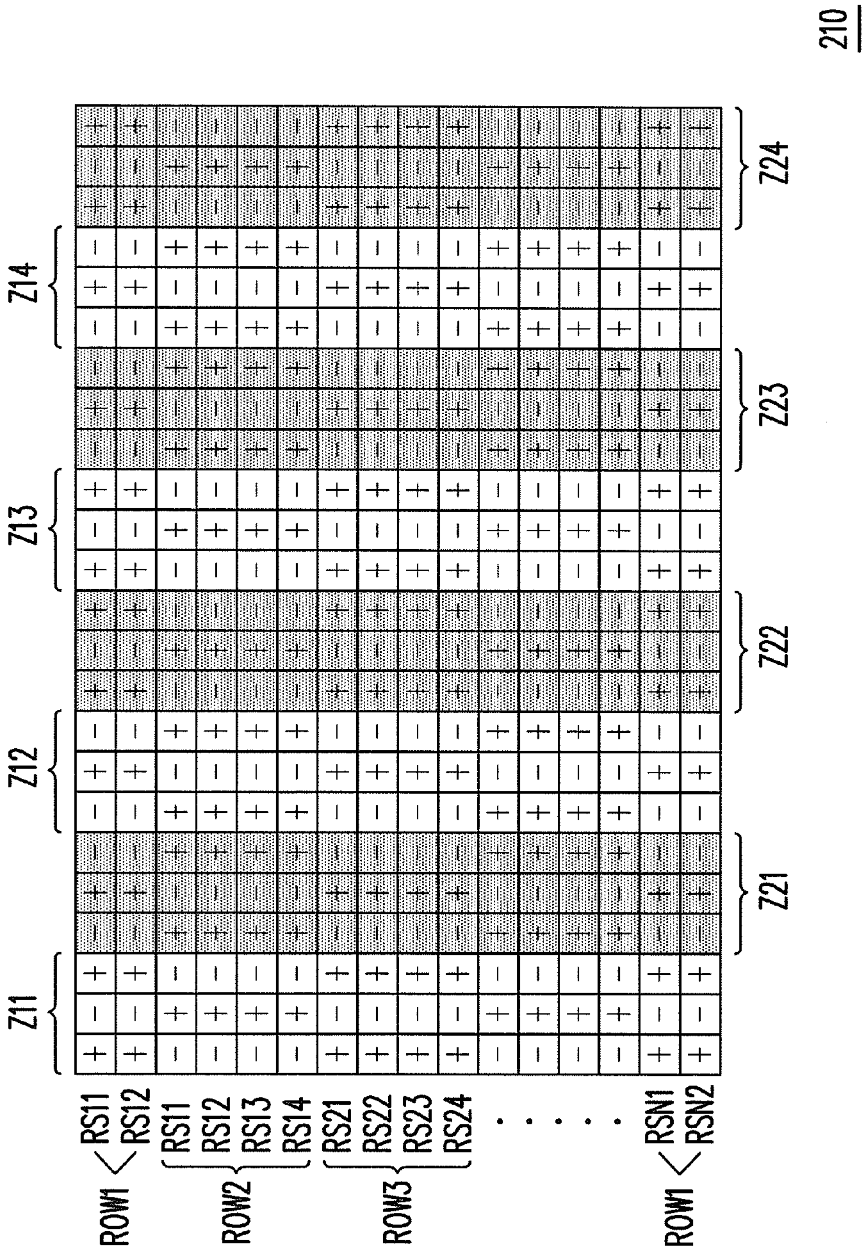

Please refer to FIG. 3E, FIG. 3E illustrates an embodiment of another driving polarity of the display panel 210. In FIG. 3E, the first display row ROW1 and the last display row ROWN of the display panel 210 respectively includes two sub display rows RS11 and RS12 and two sub display rows RSN1 and RSN2. The other display rows include four sub display rows. Taking the display rows ROW2 and ROW3 as an example, the display rows ROW2 and ROW3 respectively includes the sub display rows RS21-RS24 and the sub display rows RS31-RS34. The driving polarities of the sub display rows RS11 and RS12 are the same, the driving polarities of the sub display rows RSN1 and RSN2 are the same, the driving polarities of the sub display rows RS21-RS24 are the same, and the driving polarities of the sub display rows RS31-RS34 are the same.

It should be noted that, in the embodiments depicted in FIGS. 3B-3E, the display rows are divided into a plurality of sub display rows to drive the display panel, so as to achieve a N-dot inversion effect.

Figure 3F:
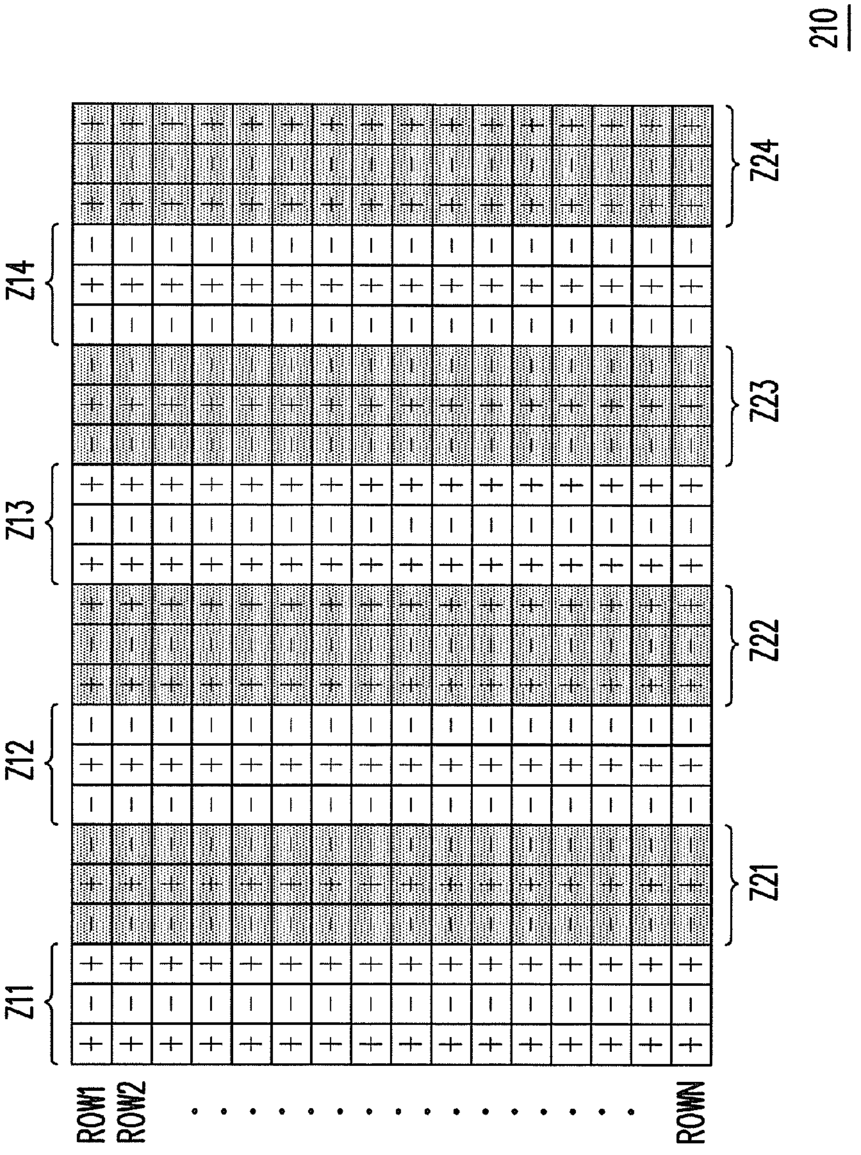

Next, please refer to FIG. 3F, FIG. 3F illustrates an embodiment of another driving polarity of the display panel 210. In FIG. 3F, the driving polarities of the display rows ROW1-ROWN are the same. In other words, in a same frame period, the driving polarities of the display rows ROW1-ROWN are the same. Therefore, by respectively making the driving polarities of the display rows ROW1-ROWN different in successive different frame periods, a column inversion driving effect can be achieved.

Figure 4:
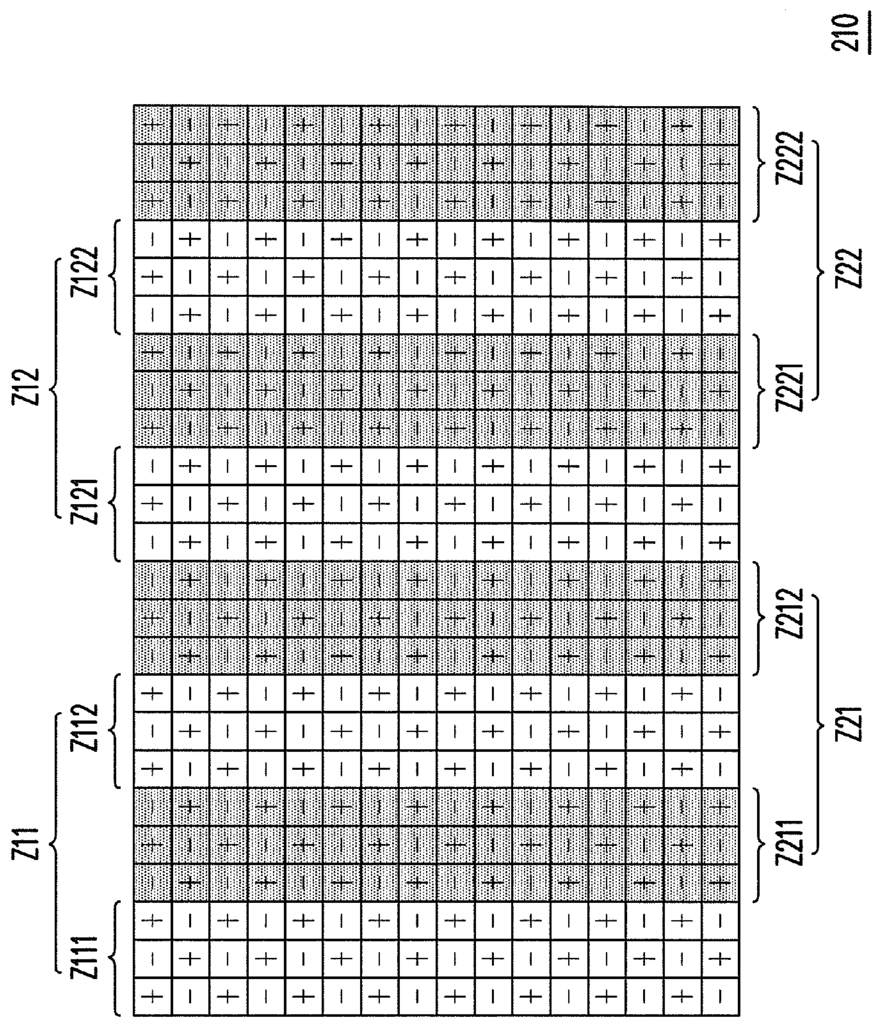
FIG. 4 illustrates an embodiment of a driving polarity of the sub driving regions of the display panel 210.

Please refer to FIG. 4, FIG. 4 illustrates an embodiment of a driving polarity of the sub driving regions of the display panel 210. In FIG. 4, the display panel 210 is divided into a plurality of first display regions Z11 and Z12 and a plurality of second display regions Z21 and Z22. Each of the first display regions Z11 and Z12 respectively includes the first sub display regions Z111 and Z112 and the first sub display regions Z121 and Z122. Moreover, each of the second display regions Z21 and Z22 respectively includes the second sub display regions Z211 and Z212 and the second sub display regions Z221 and Z222. It should be appreciated that, the driving polarities of all of the sub display regions in a same display region are the same. For example, in the first display region Z11, the driving polarities of the first sub display regions Z111 and Z112 are the same, and the driving polarities of the second sub display regions Z211 and Z212 in the second display region Z21 are the same.

Figure 5:
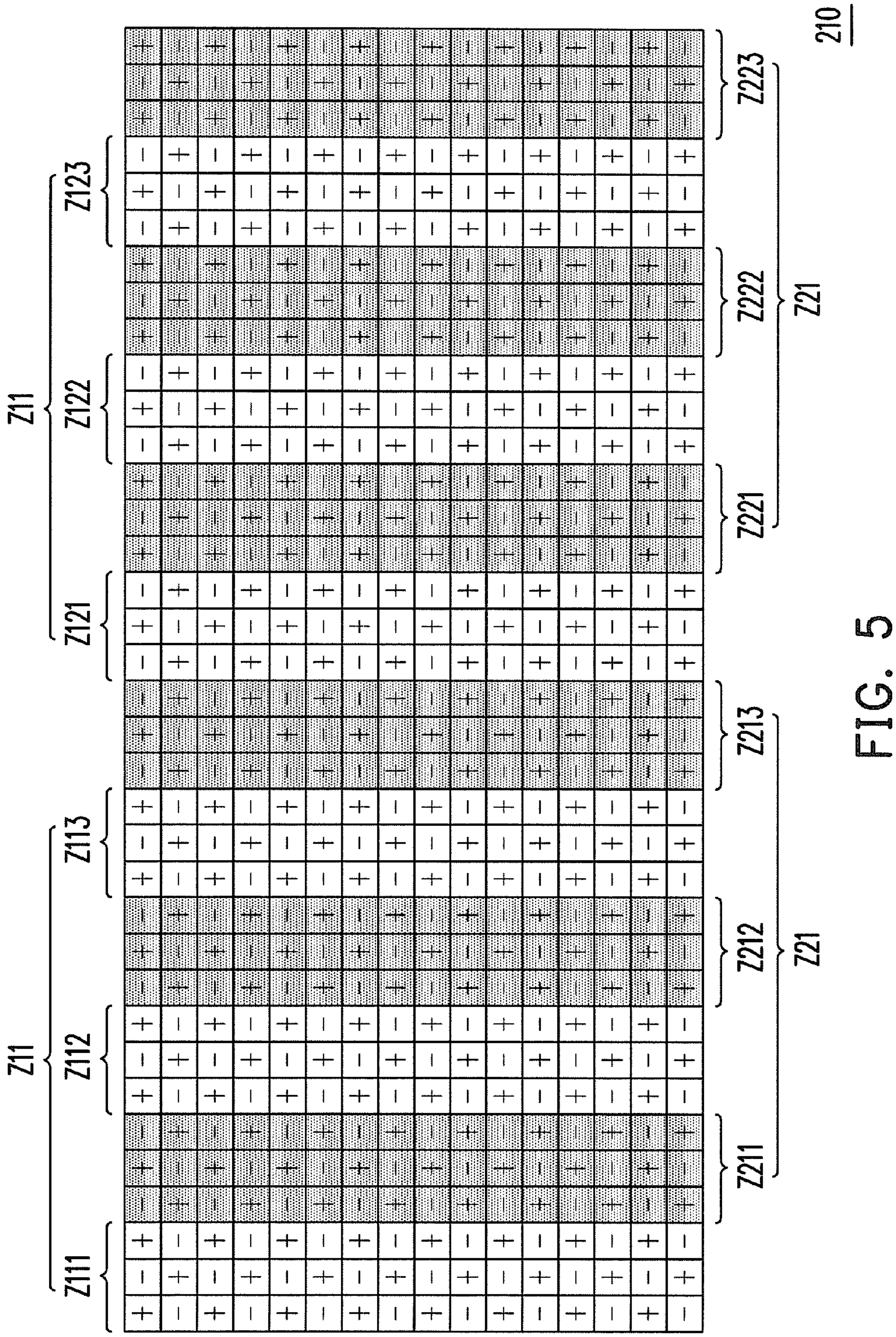
FIG. 5 illustrates another embodiment of a driving polarity of the sub driving regions of the display panel 210.

In addition, the sub display regions in a display region are not limited to two. Please refer to FIG. 5, FIG. 5 illustrates another embodiment of a driving polarity of the sub driving regions of the display panel 210. In FIG. 5, the first driving regions Z11 and Z12 respectively includes three sub driving regions Z111-Z113 and three sub driving regions Z121-Z123. The second driving regions Z21 and Z22 respectively includes three sub driving regions Z211-Z213 and three sub driving regions Z221-Z223. Moreover, the driving polarities of all of the sub display regions in a same display region are the same. In other words, the driving polarities of the sub driving regions Z111-Z113 are the same, the driving polarities of the sub driving regions Z121-Z123 are the same, the driving polarities of the sub driving regions Z211-Z213 are the same, and the driving polarities of the sub driving regions Z221-Z223 are the same.

It should be appreciated that, FIGS. 4 and 5 are merely illustrative examples, and a designer may, according to requirements, divide the driving regions into even more sub driving regions, and the designer is not limited by the two or three sub driving regions illustrated in FIGS. 4 and 5.

Referring to FIG. 6, FIG. 6 is a flow chart of a driving method of a display panel according to an embodiment of the invention. The display panel has a plurality of pixels arranged in an array. The driving method includes the following steps. First, the pixels are divided into a plurality of first display regions and a plurality of second display regions, in which each of the first display regions and each of the second display regions are arranged in the display panel alternately (Step S610). Moreover, a plurality of driving signals are provided so that the driving polarities of the neighboring first display regions are different, and the driving polarities of the neighboring second display regions are different (Step S620).

In view of the foregoing, some embodiments of the invention divide the display panel into a plurality of first display regions and second display regions, and the driving polarities of the neighboring first display regions and the neighboring second display regions are made to be different. Accordingly, the pixels belonging to the same display region can generate the polarity inversion display effect, thereby enhancing the display quality.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display apparatus, comprising:

a display panel having a plurality of pixels arranged in an array, the pixels are divided into a plurality of first display regions and a plurality of second display regions, wherein each of the first display regions and each of the second display regions interlace each other and include a plurality of pixel columns, and any adjacent two of the pixel columns for each of the first display regions and each of the second display regions are different in driving polarity; and a display driver coupled to the display panel, providing a plurality of driving signals so that driving polarities of one of the second display regions are opposite to driving polarities of one of the first display region being a left side neighboring to the one of the second display regions, and are same with driving polarities of one of the first display region being a right side neighboring to the one of the second display regions, wherein the pixel columns for each of the first display regions and each of the second display regions are at least three columns.

2. The display apparatus as claimed in claim 1, wherein each of the first and second display regions respectively comprises a plurality of first and second display rows arranged alternately, wherein the driving polarities of the first display rows and the driving polarities of the second display rows are opposite.

3. The display apparatus as claimed in claim 2, wherein each row of the first display rows in pixel polarities has a first polarity pattern, each row of the second display rows in pixel polarities has a second polarity pattern, and the first polarity pattern is opposite to the second polarity pattern.

4. The display driving apparatus as claimed in claim 1, wherein the first display regions display a first eye image, and the second display regions display a second eye image.

5. A driving method of a display panel, the display panel having a plurality of pixels arranged in an array, the pixels are divided into a plurality of first display regions and a plurality of second display regions, wherein each of the first display regions and each of the second display regions interlace each other and include a plurality of pixel columns, the driving method comprising:

providing a plurality of driving signals to the display panel so that driving polarities of one of the second display regions are opposite to driving polarities of one of the first display region being a left side neighboring to the one of the second display regions, and are same with driving polarities of one of the first display region being a right side neighboring to the one of the second display regions, and any adjacent two of the pixel columns for each of the first display regions and each of the second display regions are different in driving polarity, wherein the pixel columns for each of the first display regions and each of the second display regions are at least three columns.

6. The driving method as claimed in claim 5, wherein each of the first and second display regions respectively comprises a plurality of first and second display rows arranged alternately, wherein the driving signals provided to the display panel have the driving polarities of the first display rows and the driving polarities of the second display rows being opposite.

7. The driving method as claimed in claim 6, wherein each row of the first display rows in pixel polarities has a first polarity pattern, each row of the second display rows in pixel polarities has a second polarity pattern, and the first polarity pattern is opposite to the second polarity pattern.

8. The driving method as claimed in claim 5, further comprising:

providing the first display regions to display a first eye image, and providing the second display regions to display a second eye image.

* * * * *